Oct. 20, 1964

R. E. MEYER 3,153,324

SIMPLIFIED PRIMARY FUEL SYSTEM

Filed May 29, 1963

INVENTOR
ROBERT E. MEYER

BY Claude Funkhouser
ATTORNEY
Cornelius J. Husar
AGENT

United States Patent Office 3,153,324
Patented Oct. 20, 1964

3,153,324
SIMPLIFIED PRIMARY FUEL SYSTEM
Robert E. Meyer, Tequesta, Fla., assignor, by mesne assignments, to the United States of America as represented by the Secretary of the Navy
Filed May 29, 1963, Ser. No. 284,274
4 Claims. (Cl. 60—39.72)

The present invention relates to an improved afterburner primary fuel system for a jet engine and more particularly to an improved afterburner primary fuel system for a jet engine which provides the afterburner with a uniform combustible fuel-air mixture at the lip of the flameholder over a relatively wide range of total fuel flow and total airflow limits.

Many schemes have been developed to increase the thrust of turbojet aircraft engines for take-off and other maneuvers of the aircraft. The most common scheme for achieving the desired increase in thrust is the provision of the engine with an afterburner. The theory behind afterburners is to inject supplemental fuel into the exhaust gases, which contain a considerable amount of unburned oxygen, at a point downstream of the turbine prior to the gases leaving the propulsive jet nozzle of the engine.

Since the broad idea of providing afterburners for jet engines has been so widely accepted, further thrust increases must necessarily stem from improvements in the design of the afterburner and/or the manner of controlling the fuel-air mixture in the afterburner region.

Many attempts have been made to improve the fuel-air mixture, however, for one reason or another, point source rather than line source fuel injection has been predominantly employed. By using point source fuel injection a large number of individual fuel orifices is required thus presenting a serious clogging problem and also pressure drops. These are a few of the problems encountered in this area prior to the instant invention.

An object of the present invention is the provision of a flameholder having fuel injection permitting optimum fuel-air ratio over a wide range of flow conditions.

Another object is to provide a fuel manifold wherein the number of individual fuel orifices is substantially reduced at a given fuel flow condition allowing use of larger orifices which are less susceptible to clogging.

A further object of the invention is the provision of a more positive control of fuel distribution in the afterburner region.

Still another object is to provide an afterburner having a stagnation area at the front of the flameholder which is used as a fluid flow route.

A further object of the invention is the provision of a flameholder with varying cross-sectional geometry to provide a fluid flow path consistent with specific distribution, cooling and vaporization requirements.

Another object of the invention is the provision of a flameholder in combination with a fuel nozzle to provide flameholder cooling via fuel vaporization immediately adjacent to the flameholder skin.

Other objects and many of the attendant advantages of this invention will be readily appreciated as the same becomes better understood by reference to the following detailed description when considered in connection with the accompanying drawings wherein.

Figure 1:
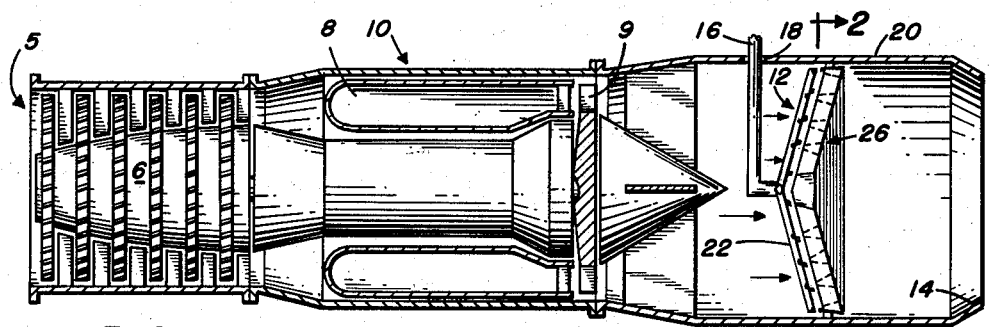
FIG. 1 is a longitudinal sectional view of a turbojet engine illustrating the afterburner region.

Referring now to the drawings, wherein like reference characters designate like or corresponding parts throughout the several views, there is shown in FIG. 1 a jet engine 10 illustrating the position of the afterburner assembly 12 with respect to the exhaust nozzle 14 and the other engine components. The engine 10 is provided with the usual compressor, combustion apparatus and turbine 6, 8, and 9, respectively, which are located upstream of the afterburner assembly 12 as shown in FIG. 1. A fuel line 16 enters through an aperture 18 in the skin 20 of the engine and supplies fuel to the flameholder 26.

Figure 2:
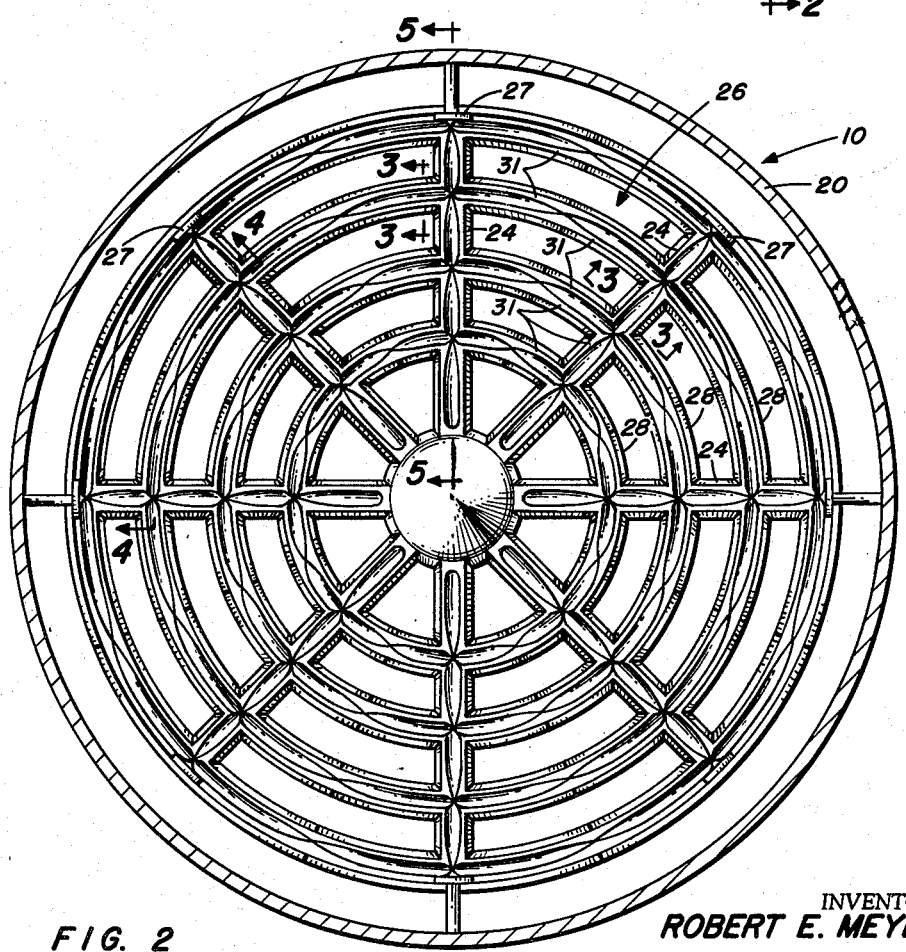
FIG. 2 is a transverse sectional view taken along lines 2—2 of FIG. 1.

FIG. 2 more clearly illustrates the location of the fuel injection system with respect to the flameholder 26. Feed line 16 is connected to a plurality of radially extending fuel spray bars 22. Each of the spray bars 22 is positioned immediately upstream of the gutters 24. The spray bars 22 terminating at the point of intersection of the gutter 24 and outermost flame ring 28. At the point of intersection of each flame ring 28 and gutter 24 each spray bar 22 is provided with plurality of orifices 30 which permit the fuel to be emitted from the spray bars.

Figure 3:
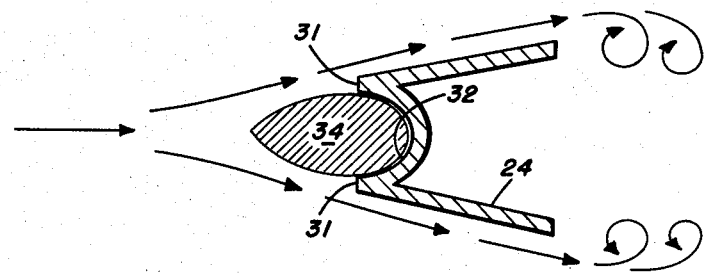
FIG. 3 is a sectional view taken along lines 3—3 of FIG. 2.
Figure 4:
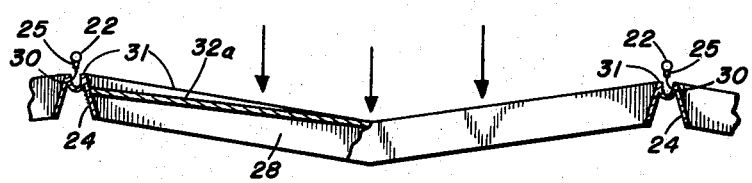
FIG. 4 is a sectional view taken along lines 4—4 of FIG. 2 illustrating the shape of the flame ring.
Figure 5:
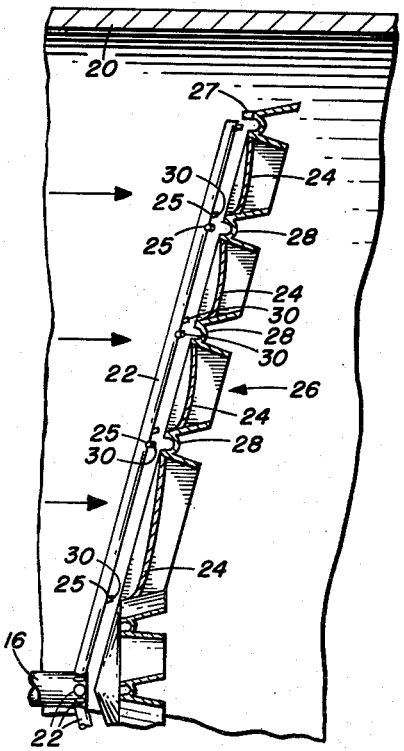
FIG. 5 is a sectional view through a gutter taken along lines 5—5 of FIG. 2.

FIG. 3 illustrates the cross-sectional configuration of the flame rings 28 and gutters 24. The nose portion of the flame ring 28 and gutters 24 are provided with a recessed portion 32. Also shown is the stagnation area 34 which is formed in recessed portion 32. As the gases, indicated by arrows, strike the flameholder there is a uniform mixing of the fuel with the gases. It is to be noted that the recessed portion 32 diminishes in depth as the gutter 24 progresses outward. The cross-sectional area in the recessed portion 32 reaches a minimum at the point of intersection with the next flame ring 28. FIG. 5 clearly illustrates the depth of recess 32 in broken lines. It is to be noted that flame rings 28 are also provided with recessed portions 32a, however, the depth of recess 32a is at a maximum at the point of intersection with gutters 24 and diminishes as it approaches the center of the flame ring 28. This feature is best illustrated in FIG. 4 as shown by the broken line. In addition, the flame ring segments 28 are angled rearward with the center of the segment at the maximum angle.

Figure 6:
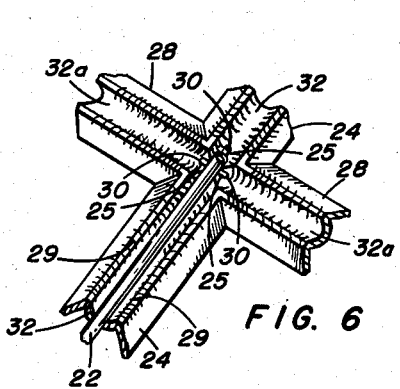
FIG. 6 is a detailed view of the flameholder section illustrating the injection of fuel circumferentially along the flame ring and radially along the gutter.

FIG. 6 illustrates the injection of the fuel at the point of intersection of gutters 24 with one of the flame rings 28. As shown, fuel is injected circumferentially in opposite directions into the flame ring 28 and also radially into gutters 24, the fuel being reelased from orifices 30. The spillover 29 is shown as the fuel travels along the stagnation area 34 in the direction of the induced flow which is away from the point of fuel injection.

Figure 7:
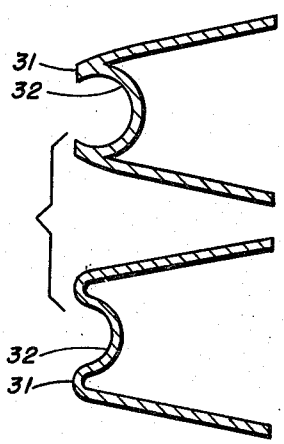
FIG. 7 illustrates alternative cross-sectional configurations of the flameholder.

FIG. 7 illustrates alternative cross-sectional configurations of the flame rings 28 and also gutters 24.

The manner in which the fuel injection system cooperates with the flameholder 26 to provide a uniform combustible fuel-air mixture at the lip of the flameholder 26 over a relatively wide range of total fuel flow and total airflow limits is more clearly shown in this view. As pointed out above, prior attempts to provide this uniformity were not satisfactory. The instant invention provides this uniformity of mixture by use of a line source rather than a point source of fuel to more nearly satisfy optimum theoretical requirements.

The configuration of the flameholder 26 differs from prior art designs in that the flameholder 26 has a recessed section 32 at the nose, it is to be noted that the recess 32 is present in both the flame rings 28 and also gutters 24 with the recess 32 facing upstream. The flame rings 28 are angled rearward between fuel injection points so that a component of the afterburner gas flow induces a flow along the recessed section 32 of the flame ring 28 in a direction away from the fuel source 25. The stagnation area 34 which is formed by recessed section 32 has a varying flow area diminishing with distance away from the fuel source 25. A fence 27 serves the function of providing a positive termination point for fuel flow along the stagnation area. Fuel is injected at a plurality of points upstream of the stagnation area 34 in the flameholder 26 and the induced flow along the stagnation area 34 carries the fuel along this route. Vaporization and spillover of the vaporized fuel occurs along this route. The rearward angle of the flame rings 28 and gutters 24, stagnation area 34 and cross-sectional configuration of the gutters 24 and flame rings 28 each contribute to and determine the amount of spillover 29 that will take place at any given point. By proper selection of these parameters, a uniform spillover along the flameholder can be achieved; thus a uniform line source of vaporized fuel at the flameholder lip 31 is attained.

It can readily be seen that the instant invention by using the front of a flameholder in combination with a fuel nozzle provides liquid or gaseous fuel distribution, vaporization, and/or mixing. In addition, positioning the flameholder relative to the gas stream such that fuel from a supply source is openly routed in a controlled manner along the stagnation area 34 at the front of the flameholder. Also, by varying the cross-sectional flameholder geometry there is provided a fluid flow path consistent with specific distribution, cooling and vaporization requirements thereby providing a uniform combustible fuel-air mixture at the lip of the flame rings 28 and gutters 24 over a relatively wide range of total fuel flow and total airflow limits.

Obviously many modifications and variations of the present invention are possible in the light of the above teachings. It is therefore to be understood that within the scope of the appended claims, the invention may be practiced otherwise than as specifically described.

What is claimed is:
1. In combination with a jet engine having a compressor, a combustion apparatus, a turbine downstream of said combustion apparatus, an afterburner assembly downstream of said turbine, each of said components operably mounted within a shell having an inlet opening and an exhaust nozzle at opposite ends thereof, said improved afterburner assembly comprising:
  fuel supply means extending through the skin of said engine;
  fuel manifold means connected to said fuel supply means;
  flameholder means having a recessed portion facing in an upstream direction and mounted downstream of said manifold means;
  said flameholder means consisting of a plurality of concentric flame rings interconnected by a plurality of radially extending gutters;
  said fuel manifold means positioned immediately upstream of said flameholder means and having a plurality of radially extending spraybars; each of said spraybars being in alignment with each of said radial gutters and having an orifice at each side thereof, said side orifices being located at the point of intersection of said gutters with each of said flame rings;
  said spraybars also having an orifice directed at said radial gutters;
  said recessed section of said flame rings and gutters being of varying cross-sectional area; abutment means located at the outermost end of said gutters to terminate the flow of fuel; whereby fuel emitted from said orifices travel circumferentially via said flame rings and radially via said gutters thus providing a uniform combustible fuel-air mixture at the lip of the flameholders over a wide range of total fuel flow and total air flow limits.

2. In combination with a jet engine having a compressor, a combustion apparatus, a turbine downstream of said combustion apparatus, an afterburner assemby downstream of said turbine, each of said components operably mounted within a shell having an inlet opening and an exhaust nozzle at opposite ends thereof, said improved afterburner assembly comprising:
  fuel supply means extending through the skin of said engine;
  fuel manifold means connected to said fuel supply means;
  flameholder means facing in an upstream direction and mounted downstream of said fuel manifold means;
  conveying means in the upstream face of said flameholder means for distributing fuel and air throughout said flameholder means;
  said conveying means formed by a recess in said flameholder means;
  said recess being at a maximum depth at the point of release of said fuel and diminishing in depth in a direction away from said fuel source to a point of minimum depth;
  said flame rings being angled rearward between fuel injection points so that a component of afterburner gas flow induces a flow along said recessed section of said flameholder;
  whereby fuel emitted from said fuel manifold means provides a uniform combustible fuel-air mixture over a wide range of total fuel flow and total air flow limits.

3. In a device of the character described in claim 2 wherein:
  said fuel supply means comprises a fuel line which extends through an aperture in said shell of said aircraft;
  said fuel line terminating at a point approximately in the center of said fuel manifold means.

4. In a device of the character described in claim 2 wherein:
  said fuel manifold means comprises a plurality of radially extending spraybars;
  said spraybars each having a plurality of orifices therein;
  each of said spraybars being in alignment with and positioned immediately upstream of said flameholder means.

References Cited in the file of this patent
UNITED STATES PATENTS
2,835,109 Longwell _____ May 20, 1958
2,937,501 Trousse _____ May 24, 1960
3,002,352 Helfrich et al. _____ Oct. 3, 1961